(12) United States Patent
Peng

(10) Patent No.: US 6,799,719 B2
(45) Date of Patent: Oct. 5, 2004

(54) BUSINESS CARD READER

(75) Inventor: David Peng, Yungho (TW)

(73) Assignee: Lite-On Technology Corporation, Taipei (TW)

( * ) Notice: Subject to any disclaimer, the term of this patent is extended or adjusted under 35 U.S.C. 154(b) by 0 days.

(21) Appl. No.: 10/449,069

(22) Filed: Jun. 2, 2003

(65) Prior Publication Data
US 2004/0169072 A1 Sep. 2, 2004

(30) Foreign Application Priority Data
Feb. 27, 2003 (TW) ...................................... 92203111 U

(51) Int. Cl.[7] .............................................. G06F 17/00
(52) U.S. Cl. ...................... 235/375; 235/380; 235/470; 709/200; 359/803; 700/203
(58) Field of Search ................. 235/380, 375, 235/470; 709/200, 205, 206, 400, 203; 359/803; 358/474; 361/653; 250/708.1

(56) References Cited

U.S. PATENT DOCUMENTS

| 5,493,105 A | * | 2/1996 | Desai ......................... 235/375 |
| 5,604,640 A | * | 2/1997 | Zipf et al. ................... 359/803 |
| 5,841,424 A | * | 11/1998 | Kikinis ........................ 345/168 |
| 6,078,557 A | * | 6/2000 | Pierson ........................ 369/273 |
| 6,484,940 B1 | * | 11/2002 | Dilday et al. ................ 235/454 |
| 6,681,991 B1 | * | 1/2004 | Li ................................ 235/439 |
| 2002/0012227 A1 | * | 1/2002 | Sa et al. ....................... 361/683 |
| 2002/0053595 A1 | * | 5/2002 | Tseng et al. ................. 235/438 |
| 2002/0195542 A1 | * | 12/2002 | Baggs ....................... 250/208.1 |
| 2003/0016488 A1 | * | 1/2003 | Huang ......................... 361/683 |
| 2003/0127515 A1 | * | 7/2003 | Sabella et al. .............. 235/439 |
| 2003/0205615 A1 | * | 11/2003 | Marappan ................... 235/375 |
| 2004/0036774 A1 | * | 2/2004 | Nichols et al. ........... 348/207.1 |

FOREIGN PATENT DOCUMENTS

JP          2002248882 A  *  9/2002  ........... B42D/15/02

* cited by examiner

*Primary Examiner*—Thien M. Le
*Assistant Examiner*—Daniel Walsh
(74) *Attorney, Agent, or Firm*—Birch, Stewart, Kolasch & Birch, LLP

(57) ABSTRACT

A business card reader includes a scanning module, a USB detecting/switching unit and two USB ports. The business card reader is connected to at least one of a personal computer and a PDA through the two USB ports, respectively. The USB detecting/switching unit controls the data transmission path among the scanning module, the personal computer and the PDA. The business card reader has a socket electrically connected to an external power source for charging a PDA connected to one USB port.

15 Claims, 4 Drawing Sheets

BUSINESS CARD READER

FIELD OF THE INVENTION

The present invention relates to a business card reader (BCR), especially to a business card reader simultaneously used for a computer and a personal digital assistant (PDA) for providing data synchronization for computer and PDA and more flexible usage.

BACKGROUND OF THE INVENTION

The business card reader is a compact scanner for reading and organizing business cards. A business card is scanned into a graphic file by the business card reader, and the graphic file of the business card is sent to a computer through a standard computer interface such as USB interface. The graphic file is then accessed by a post-processing software such as an optical character reorganization (OCR) software to convert it into text information. The text information may include Name, Title, Company, E-mail and Address field and can be saved to an address file such as MS Outlook address file.

FIG. 1 shows a schematic diagram of a prior art business card reader 10, which comprises a controller 100, a card-feeding sensor 102, a motor controller 104, a CIS module 106 and a USB port 206. The card-feeding sensor 102 will trigger the motor controller 104 to feed in a business card once the card-feeding sensor 102 detects the presence of the business card. At the same time, the CIS module 106 is activated by the card-feeding sensor 102 to scan the business card into a graphic file. The graphic file is firstly stored in the controller 100 and then sent to a computer (not shown) through the USB port 206.

As the prevailing of mobile communication and mobile computing, the user, especially in business class, generally stores address book in portable computing device such as PDA. The data in the PDA can be simultaneously updated with data in a computer by some data synchronization software such as ActiveSync. However, the prior art business card reader cannot provide data synchronization for PDA and computer due to only one USB port available. Moreover, the prior art business card reader generally get electrical power through the power pin of the USB port, which is not convenient.

SUMMARY OF THE INVENTION

It is an object of the present invention to provide a business card reader connected to two external devices and providing flexible data transmission ability.

It is another object of the present invention to provide a business card reader with charging ability for portable electronic device.

To achieve the above objects, the present invention provides a business card reader including a scanning module, a USB detecting/switching unit and two USB ports. The business card-reader is connected to at least one of a personal computer and a PDA through the two USB ports, respectively. The USB detecting/switching unit controls the data transmission path among the scanning module, the personal computer and the PDA. The business card reader has a socket electrically connected to an external power source for charging a PDA connected to one USB port.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE INVENTION

Figure 1:
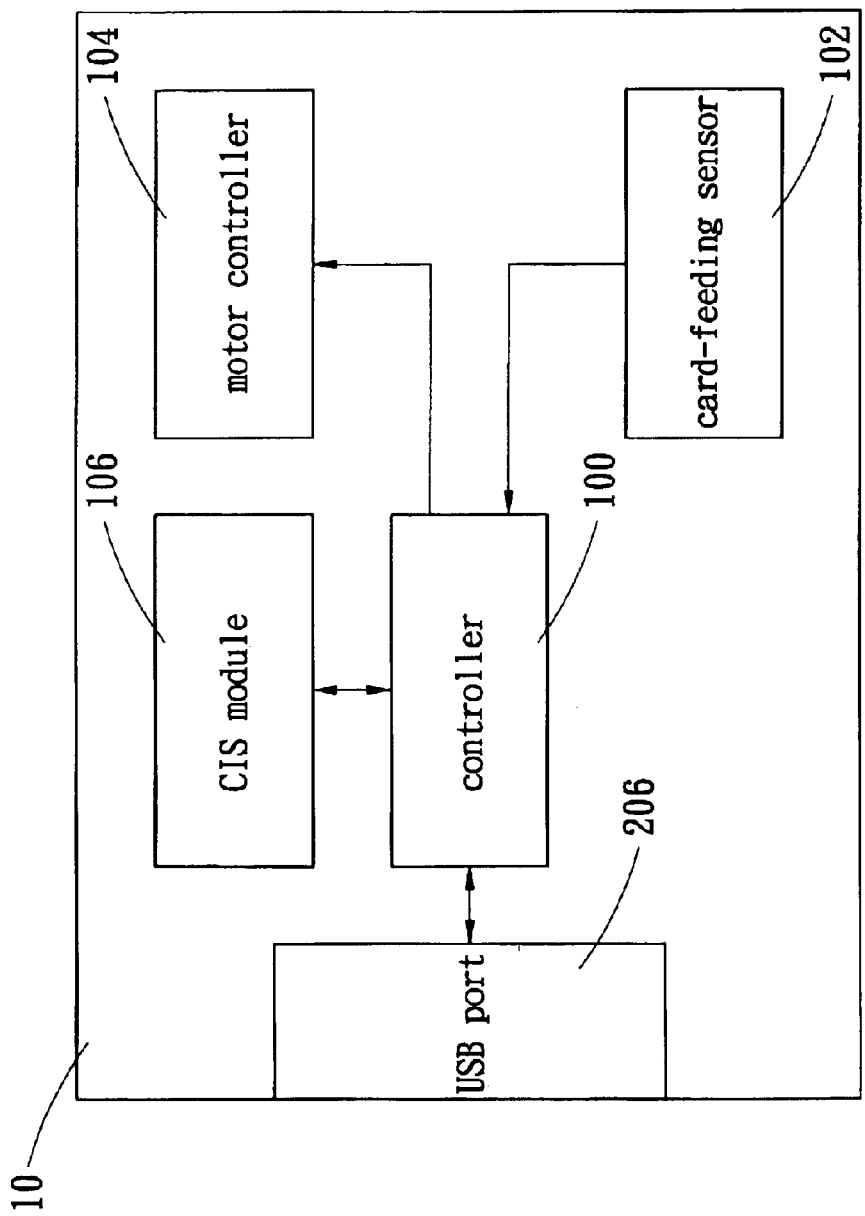
FIG. 1 shows a schematic diagram of a prior art business card reader.
Figure 2:
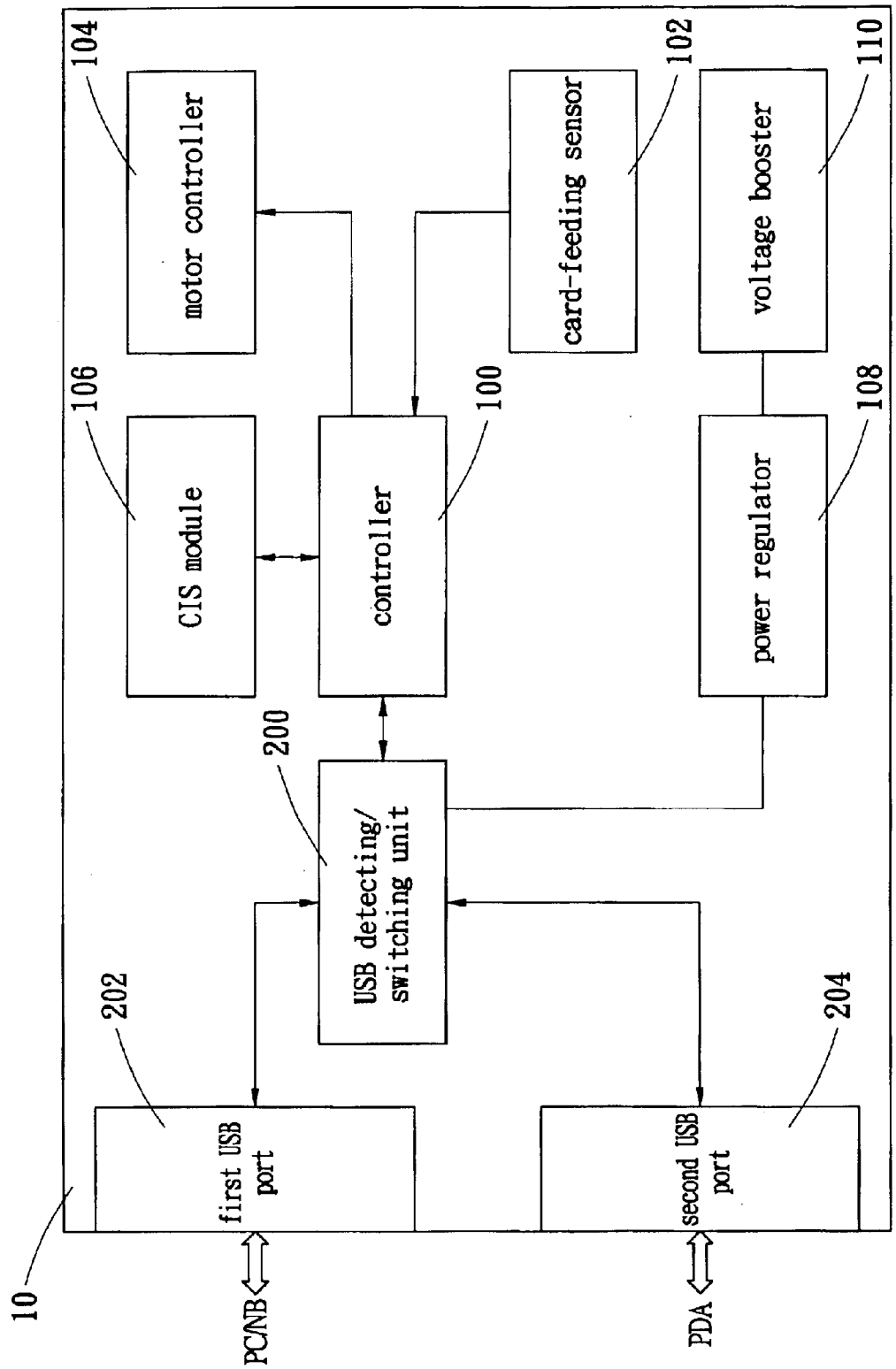
FIG. 2 shows the schematic diagram of the present invention.

FIG. 2 shows the schematic diagram of the present invention, the business card reader according to the present invention comprises a controller 100, a card-feeding sensor 102, a motor controller 104, a CIS module 106, a power regulator 108, a voltage booster 110, a USB detecting/switching unit 200, a first USB port 202 and a second USB port 204. As shown in this figure, the business card reader according to the present invention is-connected to a computer such as a notebook computer (not shown) through the first USB port 202 and connected to a PDA (not shown) through the second USB port 204. The USB detecting/switching unit 200 is functioned to detect the connection status for the first USB port 202 and the second USB port 204 in order to discriminate whether any external device such as notebook computer or PDA is connected thereto. The USB detecting/switching unit 200 has a switch SW to switch operation mode when both the first USB port 202 and the second USB port 204 are connected to external devices.

Figure 3:
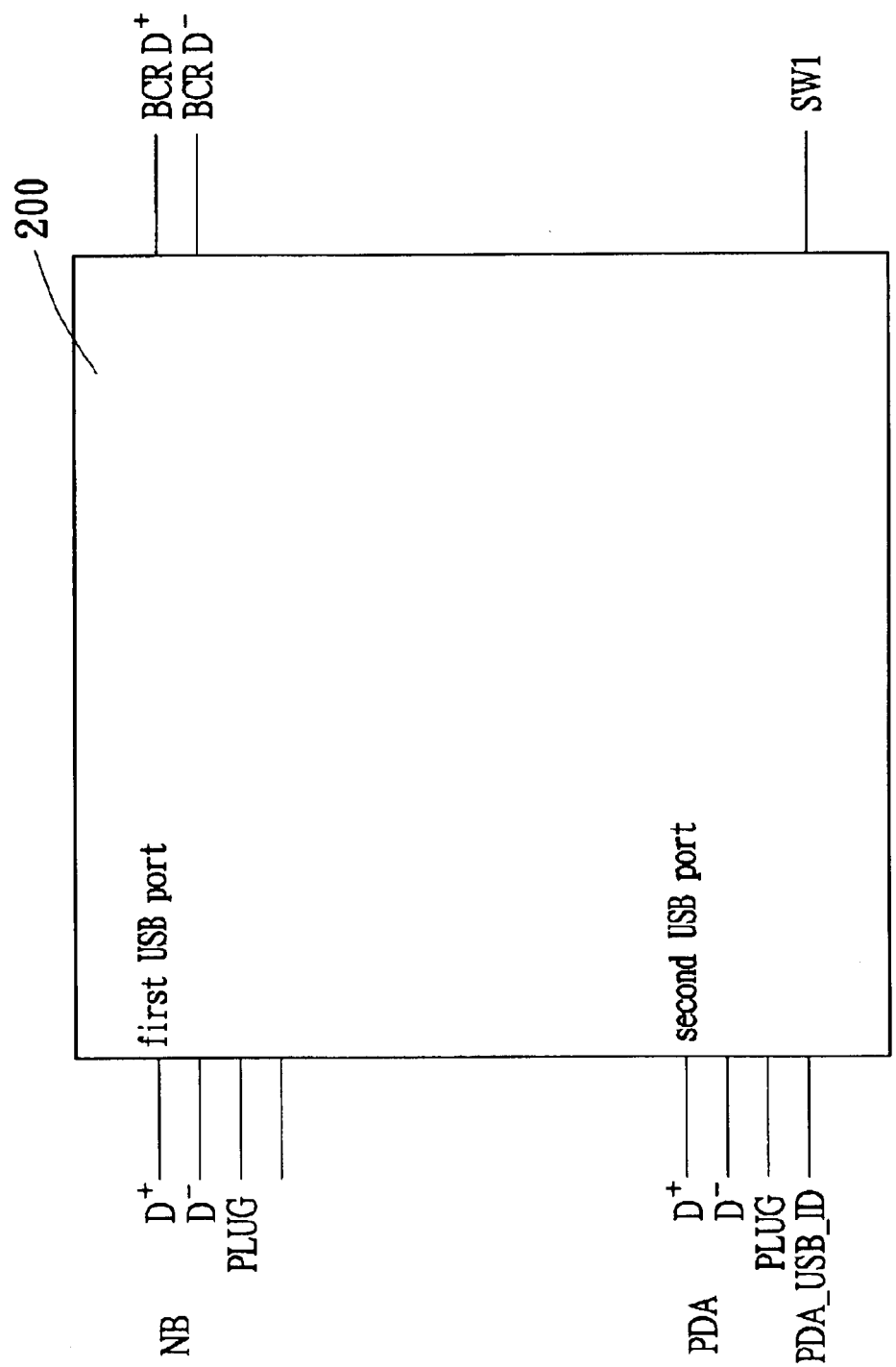
FIG. 3 shows the schematic diagram of the USB detecting/switching unit according to the present invention.

FIG. 3 shows the schematic diagram of the USB detecting/switching unit 200 according to the present invention to further manifest the connection arrangement to the external devices. The USB detecting/switching unit 200 has electrical connection to the image data pins BCR D+ and BCR D− of the controller 100. The USB detecting/switching unit 200 further has electrical connection to the data pins NB D+ and NB D− and power pin NB_PLUG of the first USB port 202 (the default connected device thereof is computer). The USB detecting/switching unit 200 further has electrical connection to the data pins PDA D+ and PDA D− and power pin PDA_PLUG of the second USB port 204 (the default connected device thereof is PDA). Moreover, the USB detecting/switching unit 200 further has electrical connection to a switch SW1. The USB detecting/switching unit 200 can detect the connection status of the first USB port 202 and the second USB port 204 by the signal level of the power pin NB_PLUG of the first USB port 202 and the signal level of the power pin PDA_PLUG of the second USB port 204. Therefore, the USB detecting/switching unit 200 can detect whether a computer and/or a PDA is connected thereto.

If only one of a computer and a PDA is connected to the business card reader by judging the signal levels of the power pins NB_PLUG and the power pin PDA_PLUG, the USB detecting/switching unit 200 can provide suitable signal connection path between the business card reader and one of the computer and the PDA. For example, the USB detecting/switching unit 200 can provide signal connection path between the image data pins BCR D+ and BCR D− of the controller 100 and the data pins NB D+ and NB D−, or provide signal connection path between the image data pins BCR D+ and BCR D− of the controller 100 and the data pins PDA D+ and PDA D−.

If the computer and the PDA are simultaneously connected to the business card reader, the USB detecting/switching unit 200 can be operated in one of the following two modes by the control of the switch SW1:

(1) Active Sync mode: the USB detecting/switching unit 200 can provide signal connection path between the data pins NB D+ and NB D− and the data pins PDA D+ and PDA D− to provide data synchronization between the computer and the PDA.

(2) PDA transfer mode: the default host for the business card reader is PDA. When the computer and the PDA are simultaneously connected to the business card reader and the USB detecting/switching unit 200 is not operated in the Active Sync mode, the USB detecting/switching unit 200 will be operated in the PDA transfer mode, as being controlled by the switch SW1. In other word, the USB detecting/switching unit 200 provides signal connection path between the image data pins BCR D+ and BCR D− of the controller 100 and the data pins PDA D+ and PDA D− in the PDA transfer mode.

The above-mentioned operations can be summarized by the following table 1.

TABLE 1

| | | Switch SW1 | | |
| --- | --- | --- | --- | --- |
| PDA | Computer | Active Sync mode | PDA transfer mode | data flow |
| V | N | X | X | BCR→PDA |
| N | V | X | X | BCR→computer |
| V | V | V | N | PDA↔computer |
| V | V | N | V | BCR→PDA |

Table legend:
V: presence
N: absence
X: don't care

Figure 4:
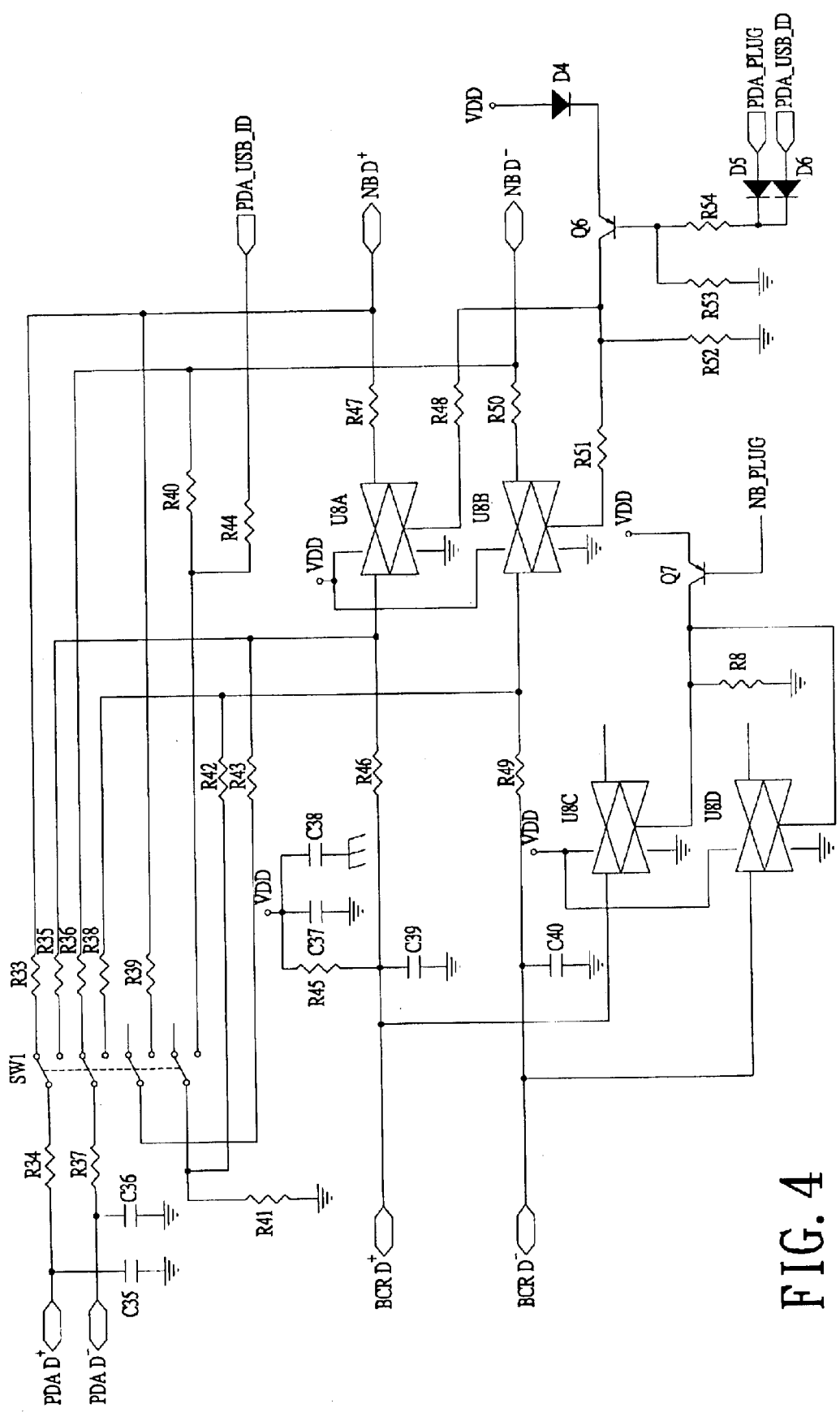
FIG. 4 shows the detailed circuit diagram for the USB detecting/switching unit.

FIG. 4 shows the detailed circuit diagram for the USB detecting/switching unit 200. The USB detecting/switching unit 200 comprises four analog switches (not labeled) controlled by the level of the power pins NB_PLUG and the power pin PDA_PLUG. Therefore, the USB detecting/switching unit 200 can switch signal connection path among the image data pins BCR D+ and BCR D− of the controller 100, the data pins NB D+ and NB D− and the data pins PDA D+ and PDA D−. The switch SW1 can control the connection path for the data pins PDA D+ and PDA D− to provide Active Sync mode or PDA transfer mode when both computer and PDA are connected to the business card reader.

Moreover, a socket (not shown) is provided to the second USB port 204 and can be connected to external electrical source. Therefore, the business card reader can provide charging function to the PDA. The provision of the power regulator 108 and the voltage booster 110 can provide electric power of good quality to the business card reader.

To sum up, the business card reader according to the present invention can provide selective signal transmission function for two external devices and charging function to portable electronic device such as PDA.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A business card reader connected to at least one of two external electronic devices, the business card reader comprising:

a scanning module; and a transmission module having a first USB port and a second USB port connected to the two external electronic devices, respectively, and a USB detecting/switching unit connected between the scanning module and the two USB ports;

when only one external electronic device is connected to the business card reader, the USB detecting/switching unit provides a data transmission path for the scanning module and the connected external electronic device;

when both two external electronic devices are connected to the business card reader, the USB detecting/switching unit can selectively perform a data synchronization mode for the two external electronic devices or at least one data transmission mode.

2. The business card reader as in claim 1, wherein the two external electronic devices are a computer and a PDA, respectively, the computer is connected to the first USB port and the PDA is connected to the second USB port.

3. The business card reader as in claim 2, wherein the USB detecting/switching unit judges the connection status of the computer and PDA by signal level of power pins of the first USB port and the second USB port.

4. The business card reader as in claim 1, further comprising a switch connected to the USB detecting/switching unit and controls the USB detecting/switching unit to operate at the data synchronization mode or at least one data transmission mode when both the two external electronic devices are connected to the business card reader.

5. The business card reader as in claim 2, during the data synchronization mode, data synchronization is performed between the computer and the PDA.

6. The business card reader as in claim 2, during data transmission mode, data transmission is performed between the PDA and the scanning module.

7. The business card reader as in claim 2, wherein the second USB port has a socket electrically connected to an external power source for charging a PDA connected to the second USB port.

8. A transmission module for connecting a business card reader to at least one of two external electronic devices, the transmission module controlling data transmission among a scanning module of the business card reader and the two external electronic devices, the transmission module comprising:

a first USB port and a second USB port connected to the two external electronic devices, respectively and a USB detecting/switching unit connected between the scanning module and the two USB ports;

when only one external electronic device is connected to the business card reader, the USB detecting/switching unit provides a data transmission path for the scanning module and the connected external electronic device;

when both two external electronic devices are connected to the business card reader, the USB detecting/switching unit can selectively perform a data synchronization mode for the two external electronic devices or at least one data transmission mode.

9. The transmission module as in claim 8, further comprising a switch connected to the USB detecting/switching unit and controls the USB detecting/switching unit to operate at the data synchronization mode or the at least one data transmission mode when both the two external electronic devices are connected to the business card reader.

10. The transmission module as in claim 8, wherein the two external electronic devices are a computer and a PDA, respectively, the computer is connected to the first USB port and the PDA is connected to the second USB port.

11. The transmission module as in claim 10, wherein the USB detecting/switching unit judges the connection status of the personal computer and PDA by signal level of power pins of the first USB port and the second USB port.

12. The transmission module as in claim 10, during the data synchronization mode, data synchronization is performed between the computer and the PDA.

13. The transmission module as in claim 10, during the data transmission mode, data transmission is performed between the PDA and the scanning module.

14. The transmission module as in claim 10, during the data transmission mode, data transmission is performed between the computer and the scanning module.

15. The transmission module as in claim 10, wherein the second USB port has a socket electrically connected to an external power source for charging the PDA connected to the second USB port.

* * * * *